US006932045B2

(12) United States Patent
Rieger

(10) Patent No.: US 6,932,045 B2
(45) Date of Patent: Aug. 23, 2005

(54) CYLINDER BLOCK FOR AN INTERNAL COMBUSTION ENGINE

(75) Inventor: Ulrich Rieger, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/994,736

(22) Filed: Nov. 22, 2004

(65) Prior Publication Data

US 2005/0092282 A1 May 5, 2005

Related U.S. Application Data

(63) Continuation-in-part of application No. PCT/EP03/02999, filed on Mar. 22, 2003.

(30) Foreign Application Priority Data

May 23, 2002 (DE) ........................................ 102 22 757

(51) Int. Cl.[7] .............................. F02F 7/00; F16M 1/00
(52) U.S. Cl. ............................... 123/195 R; 123/193.2; 123/41.79
(58) Field of Search ......................... 123/195 R, 195 H, 123/193.2, 41.72, 41.79

(56) References Cited

U.S. PATENT DOCUMENTS

| | | | | |
|---|---|---|---|---|
| 6,129,133 A | | 10/2000 | Fenn | |
| 6,216,658 B1 | * | 4/2001 | Pierro et al. | 123/193.2 |
| 6,575,124 B2 | * | 6/2003 | Shimizu et al. | 123/41.79 |

FOREIGN PATENT DOCUMENTS

| | | | |
|---|---|---|---|
| AT | 002 109 | U1 | 4/1998 |
| DE | 10 91 811 | B | 4/1961 |
| DE | 43 24 609 | C2 | 1/1996 |
| DE | 196 30 287 | A1 | 1/1998 |
| DE | 297 10 830 | U1 | 12/1998 |
| GB | 2 349 592 | A | 11/2000 |

* cited by examiner

*Primary Examiner*—Weilun Lo
(74) *Attorney, Agent, or Firm*—Klaus J. Bach

(57) ABSTRACT

In a cylinder-block for an internal combustion engine with a plurality of cylinders having longitudinal profiled sections in the form of lateral hollow reinforcement structures and vertical sections in the form of profiled reinforcement structures, in the region of a main bearing plane means are provided for supporting a lateral camshaft beneath the upper longitudinal profiled section, and, in the region of the bearing structure for the camshaft the vertical profiled section is divided in two.

5 Claims, 5 Drawing Sheets

CYLINDER BLOCK FOR AN INTERNAL COMBUSTION ENGINE

This application is a CIP of PCT/EP03/02999, filed Mar. 22, 2003.

BACKGROUND OF THE INVENTION

The invention relates to a cylinder block for an internal combustion engine having a plurality of cylinders with profiled sections in the area of a plane of a main crankshaft bearing structure.

Patent DE 43 24 609 C2 discloses a cylinder block for an internal combustion engine having a plurality of cylinders and lateral reinforcing structures in the form of longitudinal and vertical profiled sections. These hollow profiled sections are integrated in the casting forming the cylinder block. A plurality of longitudinal profiled sections are provided laterally, and a vertical profiled section is provided at each main bearing, the longitudinal profiled sections extending in the longitudinal direction of the engine and the vertical profiled sections following the profile of the side wall of the cylinder-crankcase, i.e. from the top initially parallel to the cylinder axis and then widening outward in the region of the crank case. The cavities of the profiled sections are designed such that medium can flow through them continuously.

By contrast, it is an object of the present invention to provide a cylinder-block having a reinforcing structure of longitudinal and vertical profiled sections in which a lateral camshaft can be mounted in close proximity to the cylinder walls.

SUMMARY OF THE INVENTION

In a cylinder-block for an internal combustion engine with a plurality of cylinders having longitudinal profiled sections in the form of lateral hollow reinforcement structures and vertical sections in the form of profiled reinforcement structures, in the region of a main bearing plane means are provided for supporting a lateral camshaft beneath the upper longitudinal profiled section, and, in the region of the bearing structure for the camshaft the vertical profiled section is divided in two.

The longitudinal profiled sections extending in the longitudinal direction of the engine and the vertical profiled sections following the profile of the side wall of the cylinder block, i.e. starting from the top, initially parallel to the cylinder and then outwardly in the region of the crank space. If the lateral camshaft is mounted beneath the longitudinal profiled section, that is next to the longitudinal profiled section, a narrow engine design can be achieved since the camshaft does not significantly increase the width of the internal combustion engine. However, the level where the camshaft is positioned i.e. the vertical position of the camshaft is predetermined thereby. Since, in the plane spanned by two adjacent longitudinal profiled sections, there are still the vertical profiled sections which extend perpendicular to the longitudinal profiled sections, in each main bearing mounting plane, the vertical profiled section is interrupted if the camshaft is arranged beneath a longitudinal profiled section. The vertical profiled sections are disposed in the plane the bearings of the camshaft, which are also the main crankshaft bearing planes. These planes are perpendicular to the longitudinal direction of the engine and extend in each case between two cylinders. According to the invention, the vertical profiled section is divided in two in the region of the camshaft bearings, so that a continuous flow connection with as far as possible a constant cross section is obtained and therefore a uniform or symmetrical loading on the high profiled section occurs in the event of bending or torsion of the cylinder-block. The camshaft alley, i.e. the space in which the camshaft is disposed, can likewise be designed as a longitudinal profiled section and therefore constitutes a second longitudinal profiled section beneath the upper longitudinal profiled section. In this way, a single casting core can be used to produce the reinforcing structure comprising high and longitudinal profiled sections, which results in considerable advantages in terms of manufacturing costs and the quality or tolerance of the positioning of the individual casting cores with respect to one another.

In one configuration of the invention, in each case a partial portion of the divided vertical profiled section is arranged in front of the bearing arrangement of the camshaft and a partial portion is arranged behind the bearing arrangement of the camshaft, as seen in the longitudinal direction of the engine. This means that despite crossing the camshaft, a continuous vertical profiled section is retained and the space required to bypass the bearing arrangement of the camshaft does not disrupt the external contour of the engine. The bearing which supports the camshaft is integrally formed by the cylinder block at the cylinder side of the divided vertical profiled section and, on the opposite side, by the outer wall of the vertical profiled section.

In a further configuration of the invention, the vertical profiled section forms at least an upper and a lower cavity by closure elements. The introduction of closure elements makes it easy for the cavities of the longitudinal and vertical profiled sections to be divided into two separate portions in order for different media to be routed therein without, however, losing the advantage of a common casting core which is simple to produce and allows accurate blank castings to be produced on account of its inherent stability.

In a further configuration of the invention, coolant can flow through an upper longitudinal profiled section and an upper cavity arranged on the opposite side of the cylinder-block from the bearing arrangement for the camshaft. In this way, the cavity of the reinforcing profiled sections can be ideally utilized as a coolant distributor passage to the individual cylinders, since it extends over the entire length of the cylinder-block and has a virtually constant cross section. A supply of coolant which is as uniform as possible is only required on one side of the engine; the coolant leaves the engine for example via the cylinder head.

In a further configuration of the invention, a lower cavity of the longitudinal and vertical profiled sections is in communication with an oil space of the cylinder-block and serves as a pressurized-oil supply line or a line for crankcase ventilation.

In still a further configuration of the invention, on the side of the cylinder block, on which the bearing structures for the camshaft are arranged, elements of a valve operating mechanism are provided in an upper cavity of the vertical profiled section and/or in the longitudinal profiled section. Since the camshaft is mounted in, or beneath, a longitudinal profiled section which is in communication with the upper longitudinal profiled section, i.e. both profiled sections are filled with lubricating oil or oil mist, it is advantageous for these spaces to be used for the actuating elements of the valve operating mechanism, such as for example push rods. This means that the external contour of the internal combustion engine or the crankcase is not significantly increased in size despite the longitudinal profiled sections, vertical profiled sections, a lateral camshaft and the valve operating mechanism.

The invention will become more readily apparent from the following description of exemplary embodiments thereof illustrated in a simplified representation in the accompanying drawings.

DESCRIPTION OF THE PREFERRED EMBODIMENTS

Figure 1:
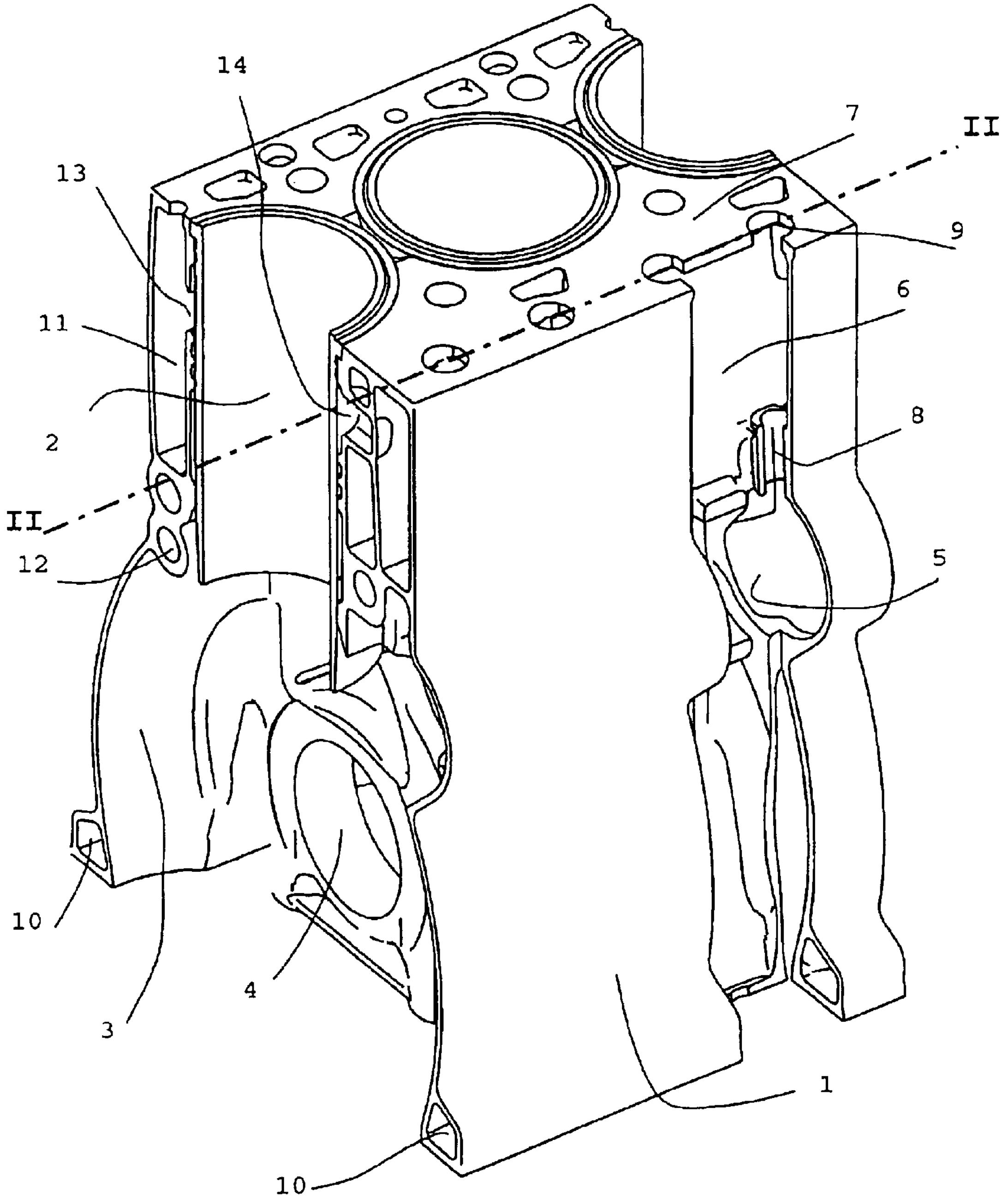
FIG. 1 shows a perspective illustration of a cylinder block according to the invention.

FIG. 1 shows a cylinder-block 1 having a plurality of cylinders 2 and a crank space 3. In the crank space 3, a crankshaft bearing 4 is located between two cylinders 2. A cavity 5, known as the camshaft bearing alley, in which a camshaft (not shown) is mounted, is arranged on the outer side of the cylinder block in the transition area from the upper cylinder part of the cylinder block 1 to the crank space 3. This cavity 5 is formed as a longitudinal profiled section. Above this cavity 5 there is a further, upper, longitudinal profiled section 6, which serves to longitudinally reinforce the cylinder block 1 and in particular to reinforce the cylinder cover 7 and is likewise hollow. Furthermore, tappets (not shown) of a valve-actuating mechanism are accommodated in this longitudinal profiled section 6. The guides 8 for the tappets and the passages 9 for the push rods are provided in the cylinder-block 1. A reinforcing hollow longitudinal profiled section 10 is likewise arranged at the lower end of the cylinder block.

Three hollow longitudinal profiled sections 10', 11, 12 are likewise arranged on the opposite side of the cylinder-block 1 from the camshaft, the longitudinal profiled section 10 being arranged at the lower end of the cylinder-block corresponding to the longitudinal profiled section 10 on the camshaft side. Since neither camshaft nor tappets are provided on this side of the cylinder block, the longitudinal profiled sections 11, 12 are of simpler design, i.e. are rectilinear without any sudden changes in cross-section. At the passage 13, a coolant flows from the longitudinal profiled section 11, which is designed as a coolant distributor passage, into the cooling jacket 14 surrounding the cylinders 2.

Figure 2:
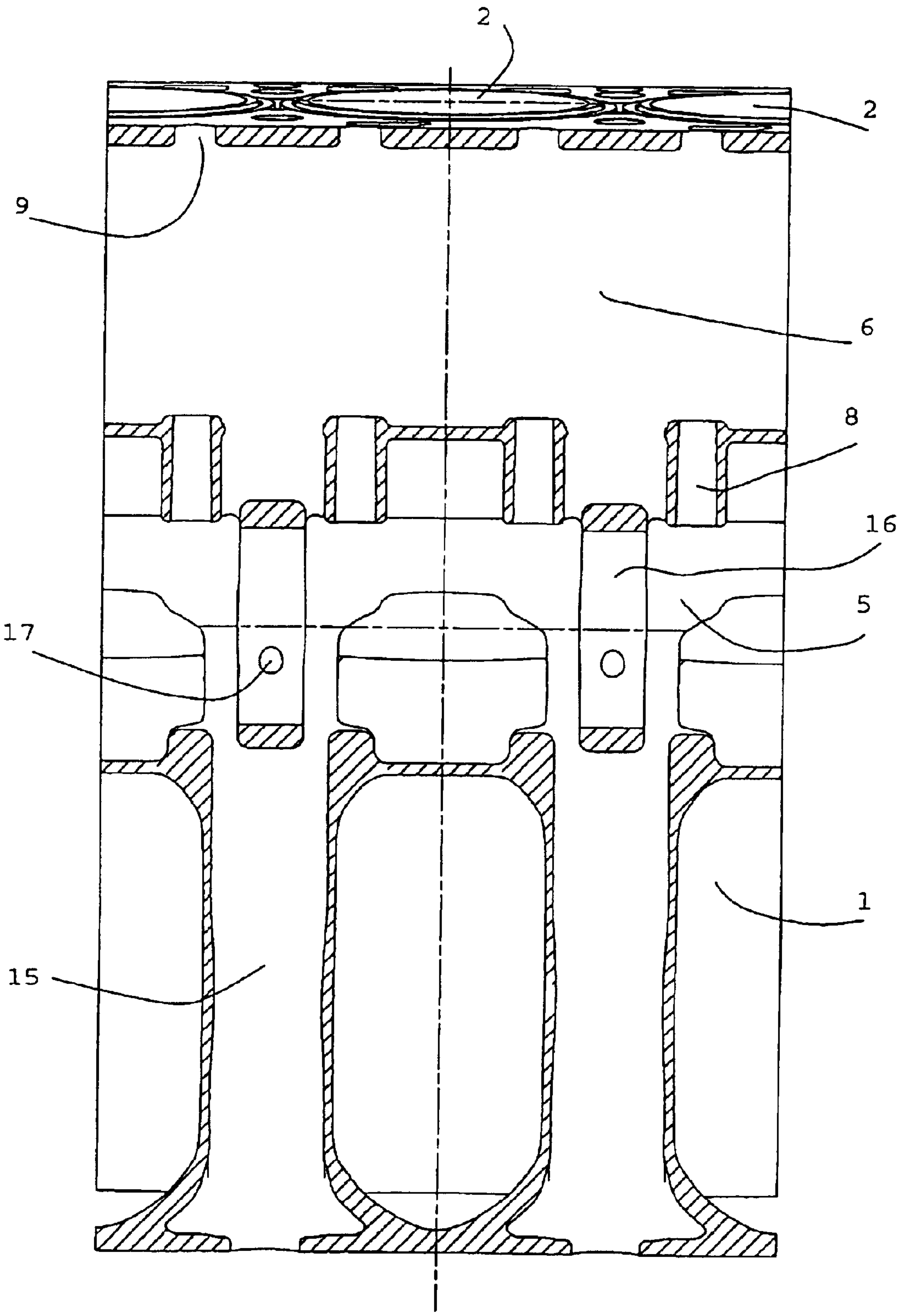
FIG. 2 shows in a longitudinal sectional view taken along line II—II of FIG. 1 a camshaft bearing alley.

FIG. 2 shows the cylinder-block 1 according to the invention as shown in FIG. 1 in the form of a longitudinal section through the camshaft bearing alley 5 over one full and two adjacent half cylinders 2. From the longitudinal profiled section 6, hollow high profiled sections 15 lead via the cavity of the camshaft bearing alley 5 to the lower edge of the cylinder block 1. The vertical profiled sections 15 are arranged in the main bearing plane between two cylinders 2. The camshaft (not shown) is mounted in camshaft bearings 16, which for their part are connected to the cylinder block 1 by casting structures in front of, and behind, the sectional plane shown in the figure. The lubricant for the camshaft is supplied through the bores 17 in the camshaft bearing 16. The tappets (not shown) for actuating the gas exchange valves are guided in the guides 8 and project out of the cylinder-block 1 into the cylinder head (not shown) through the passages 9. The rectilinear profile of the high profiled sections 15 from the longitudinal profiled section 6 to the lower edge of the cylinder block 1 is interrupted by the camshaft bearing alley 5. In the region of the camshaft bearings 16, the vertical profiled sections 15 are divided in two which extend around the camshaft bearings. As seen in the direction of the camshaft bearing alley 5, the bearing cavity is formed by one part of the vertical profiled section 15 extending in front of the camshaft bearing 16, and the other part extending behind the camshaft bearing 16. This results in a continuous, virtually constant flow cross-section from the top downward.

Figure 3:
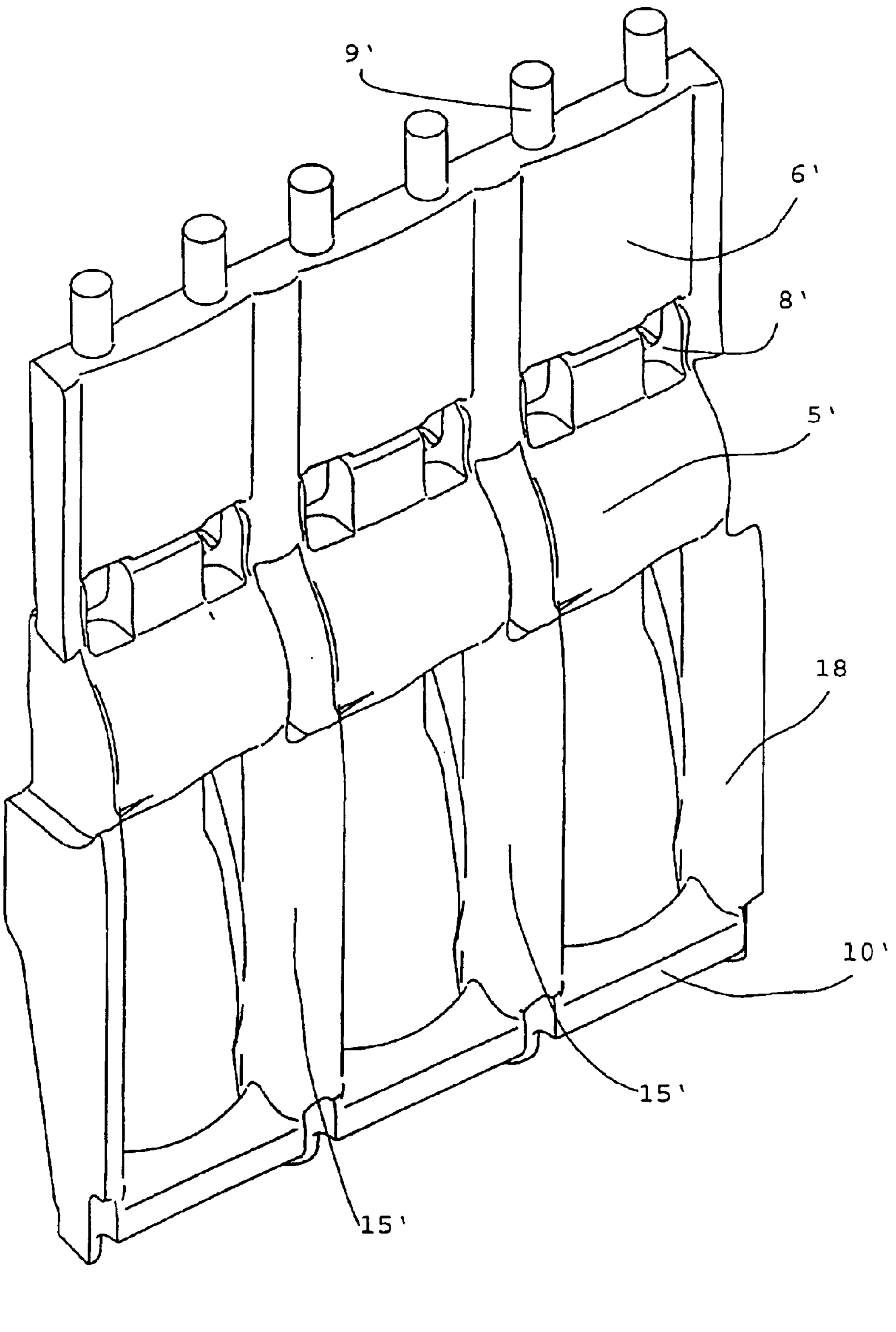
FIG. 3 shows a perspective illustration of a casting core of the camshaft side of the cylinder block.

FIG. 3 shows the casting core 18 for the reinforcing structure of the cylinder block 1 in a perspective view of the camshaft side as seen from the outside. The casting core 18 is composed in particular of the portions for the vertical profiled sections 15' and the longitudinal profiled sections 5', 6', 10'. Moreover, the drawing shows cores for the passages 9' and the guides 8' for the valve-actuating devices. Since the guides 8' comprise an integrally cast part which is subsequently drilled, they are formed as a cavity or void in the casting core, which consists, for example, of molding sand.

Figure 4:
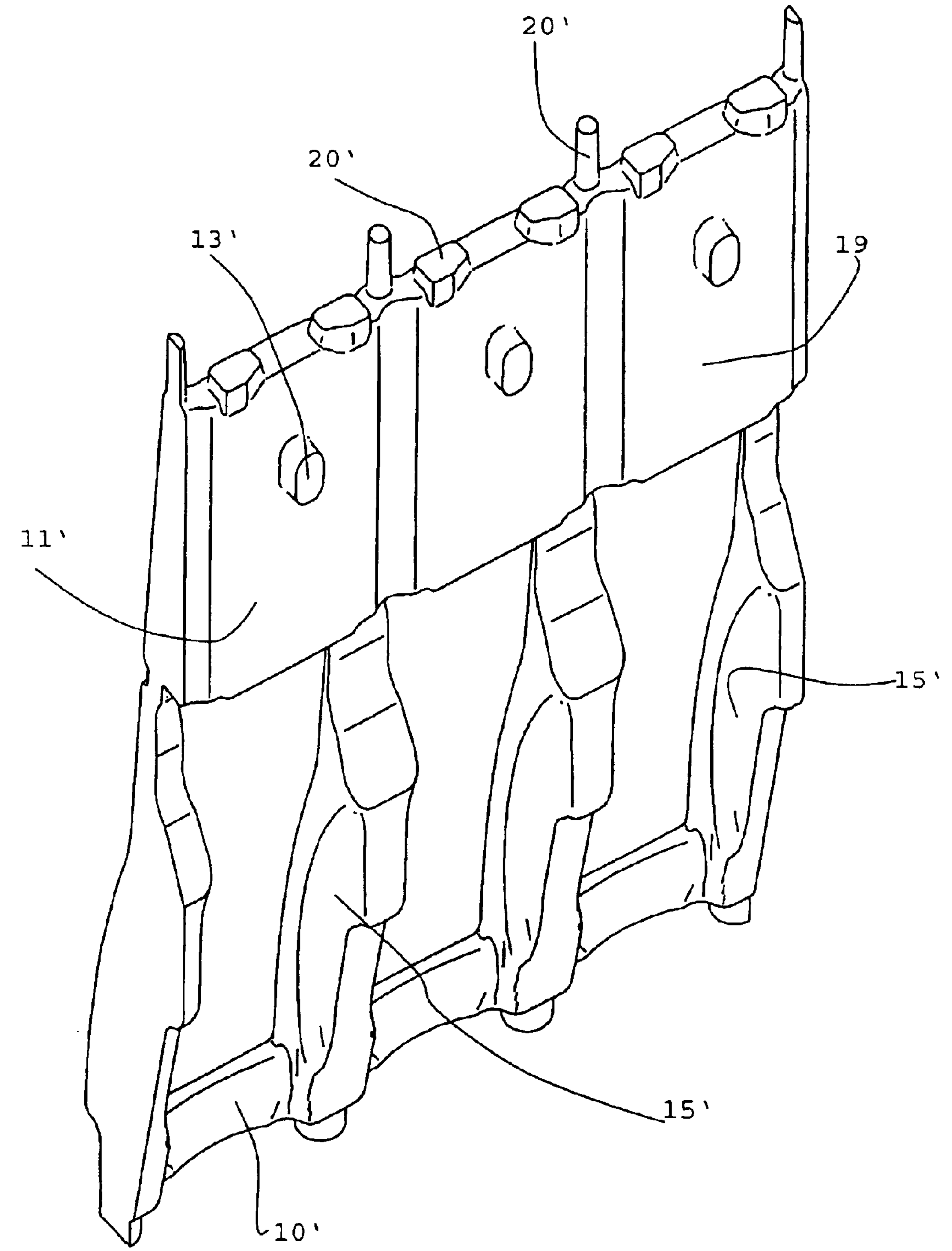
FIG. 4 shows a perspective illustration of a casting core of the side of the cylinder block from the camshaft, and opposite the side shown in FIG. 3.

FIG. 4 shows the casting core 19 of the reinforcing structure of the cylinder block 1 in the form of a perspective view as seen from the inside toward the side of the cylinder block opposite the camshaft. The casting core 19 is composed in particular of portions for the vertical profiled sections 15' and for the longitudinal profiled sections 10', 11'. The passages 13' for the coolant are arranged at the portion for the upper longitudinal profiled section 11'. The projections 20' which protrude from the casting core result in apertures in the finished cylinder block 1. During casting, they are used to hold and connect the various casting cores to one another, and in the finished cylinder-crankcase form flow passages, for example for transferring coolant from the cylinder block to the cylinder head.

Figure 5:
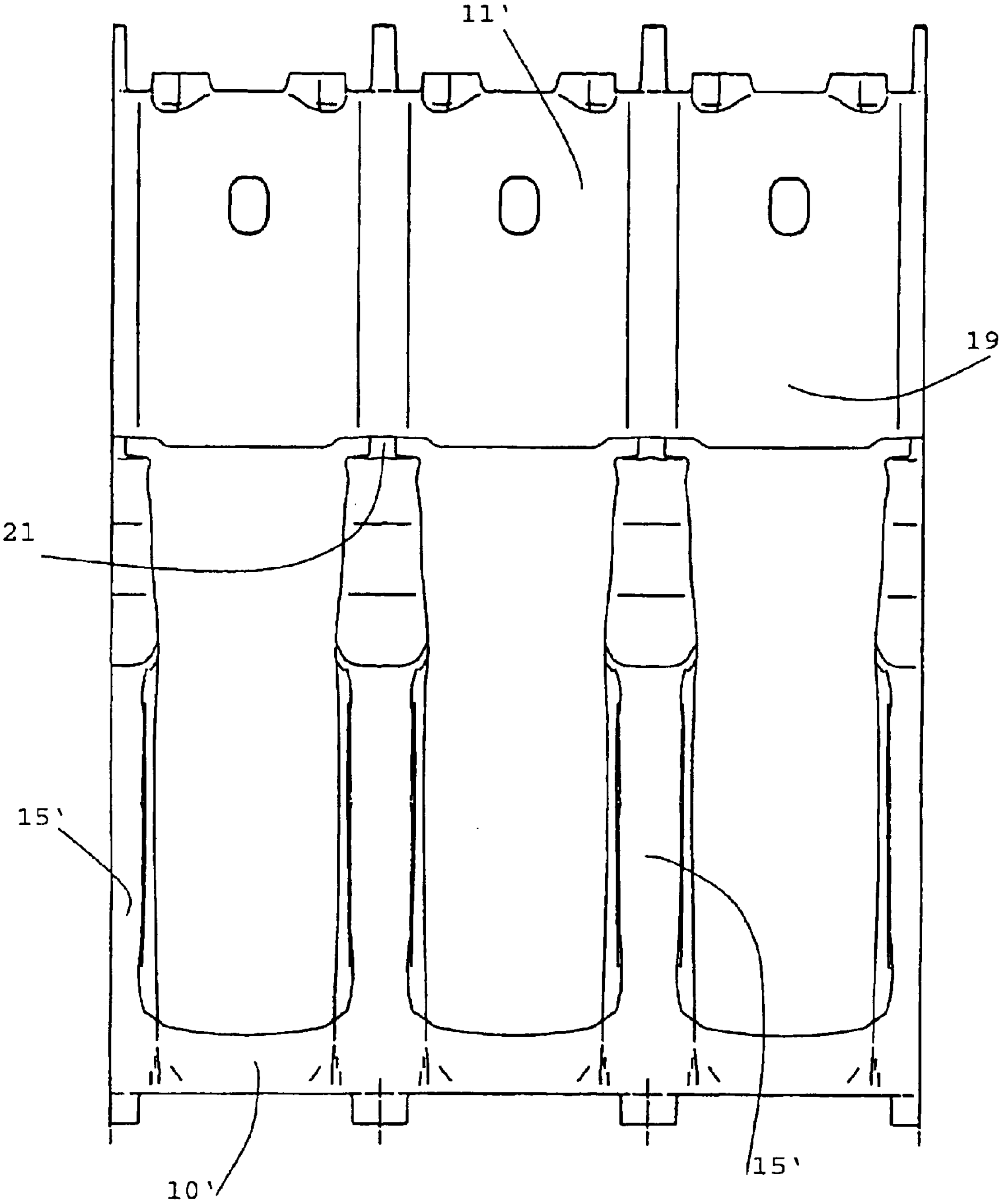
FIG. 5 is a lateral plan view of a casting core of the opposite side of the cylinder block opposite the camshaft.

FIG. 5 shows the casting core 19 of FIG. 4 in a side view from the inside outward in the transverse direction of the engine. In addition to the portions for the longitudinal profiled sections 10', 11' and the vertical profiled sections 15', this figure also shows the transition location 21 from the vertical profiled section 15' to the upper longitudinal profiled section 11'. According to the invention, on the opposite side from the camshaft, the profiled structure comprising longitudinal and vertical profiled sections is cast around a casting core 19, but the cavities which result from the casting core are divided into two separate cavities by closure elements at the transition location 21.

What is claimed is:

1. An integrally cast cylinder block (1) for an internal combustion engine having a plurality of cylinders (2) with a plurality of longitudinal profiled sections (6, 10, 11, 12) in the form of lateral hollow reinforcement structures and at least one vertical profiled section (15) in the form of a reinforcement structure in the region of a main bearing plane that is oriented approximately in the direction of the cylinders, a lateral camshaft support structure disposed beneath an upper longitudinal profiled section (6), said vertical profiled section (15) being divided in the region of a bearing plane (16) in two parts forming the camshaft support structure in said cylinder-block, one part of the vertical profiled section (15) being disposed in front of the camshaft bearing structure and the other part of the vertical profiled section (15) being disposed behind the camshaft bearing structure.

2. The cylinder block (1) as claimed in claim 1, wherein the vertical profiled sections (15) are each divided by closure elements into at least an upper cavity and a lower cavity.

3. The cylinder block (1) as claimed in claim 2, wherein the vertical profiled section (15) and an upper longitudinal profiled section (11) arranged on the opposite side of the cylinder block from the bearing arrangement (16) of the camshaft include cavities forming flow passages for conducting coolant through the engine.

4. The cylinder block (1) as claimed in claim 2, wherein a lower cavity of the vertical profiled section (15) is in communication with an oil space of the cylinder-block (1).

5. The cylinder block (1) as claimed in claim 1, wherein operating elements of a valve operating mechanism are arranged in an upper cavity of the vertical profiled section (15) and in the longitudinal profiled section (6) on that side of the cylinder-block (1) where the bearing structure (16) for the camshaft is arranged.

* * * * *